United States Patent [19]

Watrous

[11] 3,931,641
[45] Jan. 6, 1976

[54] TRANSDUCER SUSPENSION MOUNT APPARATUS
[75] Inventor: Robert B. Watrous, Los Gatos, Calif.
[73] Assignee: International Business Machines Corporation, N.Y.
[22] Filed: Aug. 22, 1974
[21] Appl. No.: 499,738

[52] U.S. Cl. ................................. 360/104; 360/103
[51] Int. Cl.².. G11B 5/48; G11B 21/16; G11B 5/60
[58] Field of Search ............ 360/103, 104, 105, 128

[56] References Cited
UNITED STATES PATENTS

| | | | |
|---|---|---|---|
| 3,310,792 | 3/1967 | Groom et al. | 360/103 |
| 3,582,920 | 6/1971 | Billawala | 360/103 |
| 3,599,193 | 8/1971 | Cote et al. | 360/103 |
| 3,665,434 | 5/1972 | Applequist et al. | 360/103 |
| 3,668,668 | 6/1972 | Robitschek | 360/103 |
| 3,701,610 | 10/1972 | Buslik et al. | 360/103 |

*Primary Examiner*—Robert S. Tupper
*Attorney, Agent, or Firm*—James A. Pershon

[57] ABSTRACT

A magnetic head arm assembly has a suspension for an air bearing head slider that includes a substantially rectangular flexure with two parallel flexible narrow fingers and relatively stiff crosslegs, and a central finger to which the slider is attached. A load beam is fastened to the flexure so as to engage a load protuberance formed with the central finger. Flexibility of pitch around a longitudinal axis and roll around an orthogonol axis are provided thereby. Stiffness and rigidity against radial, circumferential and yaw motions are also realized.

15 Claims, 8 Drawing Figures

TRANSDUCER SUSPENSION MOUNT APPARATUS

BACKGROUND OF THE INVENTION

1. Field of the Invention

This invention relates to an improved magnetic head arm assembly, and in particular to a novel suspension for an air bearing head slider.

2. Description of the Prior Art

It is known that a magnetic head arm assembly, which is employed for radially accessing different data tracks of a rotating magnetic disk, is subject to different forces that will vary the spatial position of the head transducing gap relative to a data track that is being scanned. For example, heads that access different tracks on the surface of a magnetic disk and that start and stop in contact with the rotating disk experience undesirable radial and circumferential forces. Frictional drag is generated while stopping or starting the disk, thereby producing circumferential forces that affect head performance. Yaw moments appear usually as secondary effects. Thus, in order to maintain wear of the head and the disk within practical limits, the head load and thus the frictional drag are kept low, in the order of 10 grams or less, for example. As a result, the largest forces that are experienced by the head suspension are the radial accessing forces.

In view of the changing topography of the disk surface, and in order to have the magnetic transducer closely follow the disk surface at a constant spacing and attitude, it is desirable to enable the air bearing head slider and its supporting suspension to pitch around a first axis, and to roll about a second axis orthogonal to the first axis. It is also an objective to minimize the effect of radial and circumferential forces that are applied to the head arm, and to eliminate yaw. Prior known magnetic head suspensions solve one or more but not all of these problems simultaneously, and not all with the same degree of success. However, it would be highly advantageous to achieve flexibility of movement for roll and pitch of the magnetic transducer, of the slider to which it is joined, and of the flexure or supporting suspension for the slider, while realizing rigidity against radial, circumferential and yaw motions.

SUMMARY OF THE INVENTION

An object of this invention is to provide a novel and improved magnetic head arm assembly useful for accessing different data tracks of a storage medium.

Another object of this invention is to provide a head arm assembly that is responsive to changes in topography of the surface of a storage medium so as to maintain a substantially uniform close distance and attitude between the head transducing gap and the storage surface.

Another object is to provide a head suspension that effectively responds with pitch and roll motions to follow the changes in the surface of a magnetic medium.

A further object is to provide a suspension for a magnetic head assembly that effectively resists undesirable radial, circumferential and yaw motions.

In accordance with this invention, a magnetic head arm assembly comprises a suspension system for an accessing magnetic head assembly, which includes a substantially rectangular section having two narrow flexible fingers that are disposed parallel to a longitudinal axis defining the accessing path of the head assembly. These fingers are joined by two sturdier and wider crosslegs to close the rectangular section. An air bearing slider that incorporates the transducing element and nonmagnetic sensing gap is mounted to an intersecting narrow finger extending from one crossleg and having a free end that runs parallel to and centrally of the outer flexible fingers. The assembly includes a load protuberance disposed on said central narrow finger, which is contacted by a load beam located within a flanged channel of the head arm assembly. The channel is part of a spring element which is attached to a rigid arm and mounted for engagement with an actuator to enable accessing.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figure 1:
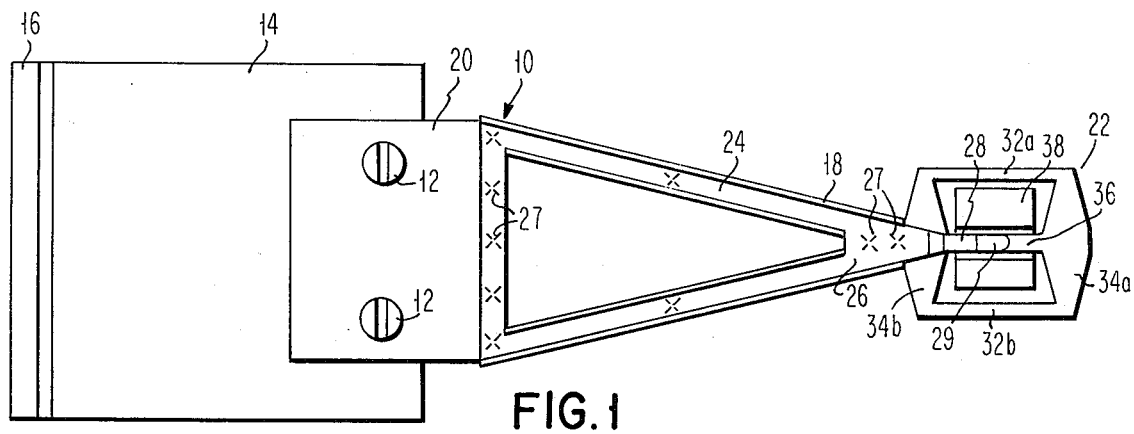
FIG. 1 is a top plan view of the magnetic head arm assembly, made in accordance with this invention.
Figure 2:
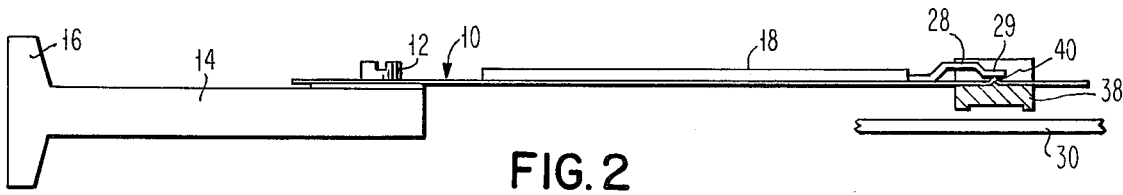
FIG. 2 is a side view of the novel assembly of FIG. 1.
Figure 3:
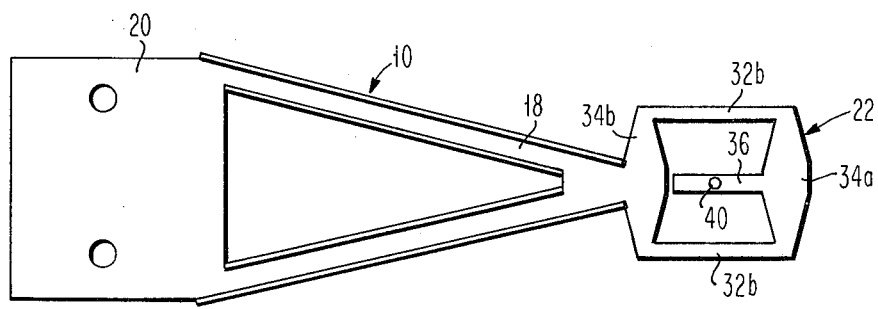
FIG. 3 is a top plan view of the spring suspension portion of the magnetic head arm assembly of FIG. 1.
Figure 4:
FIG. 4 is a side view of the spring suspension portion of FIG. 3.
Figure 5:
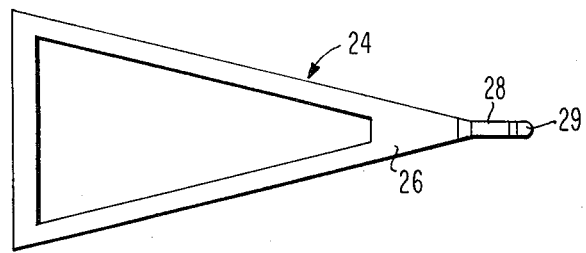
FIG. 5 is a top plan view of the load beam used in the magnetic head arm assembly of this invention.
Figure 6:
FIG. 6 is a side view of the load beam illustrated in FIG. 5.

With reference to FIGS. 1–6, a preferred embodiment of a magnetic head arm assembly made in accordance with this invention includes a spring element 10 made of stainless steel for example, attached by screws 12, or welds, to a rigid arm section 14, which may be made of aluminum. The arm section 14 is joined to a mount segment 16, which is mounted to an actuator assembly (not shown) that may include a T-block for carrying a multiplicity of head arm assemblies, as found in accessing head disk files.

The spring element 10 is formed with a triangular portion 18, joined at its base to a rectangular portion 20 and at its apex to a flexure 22. The triangular portion 18 is flanged to form a channel in which a flat load beam structure 24 is fixed, by welds for example. The load beam has a triangular section 26 that fits into the flanged channel, and is connected to the flexure 22 by welds 27 for example. At the apex of the triangular section 26, the load beam 24 is characterized by an offset 28 having a portion 29 at its end used for loading the air bearing magnetic assembly to the moving medium 30, which may be a rotating disk.

The flexure 22 is formed with two narrow flexible outer fingers 32a, 32b which run parallel to the longitudinal axis defined by the head arm assembly. The longitudinal axis generally defines the path of data track accessing followed by the head arm assembly during operation of an accessing type disk file. An axis that is orthogonal to and intersects the longitudinal axis delineates the path which is followed by the data track as it traverses the head transducing gap. The two outer flexible fingers 32a,b are joined by sturdy thicker crosslegs 34a,b, substantially parallel to the orthogonal axis, to complete the general configuration of the rectangular flexure.

Protruding from the outermost cross leg 34a is a central finger 36 which has a free end facing the cross leg 34b. The central finger 36, which is parallel to and substantially of the same thickness as the two outer flexible 32a,b, supports an air bearing head slider assembly 38, which contains the magnetic transducer and sensing gap. On the other surface of the central finger than that supporting the slider is a load button or protuberance 40, which is located on the longitudinal axis of the head arm assembly, and on the intersecting orthogonal axis which bisects the flexure and the narrow flexible fingers 32a,b. Thus, the load protuberance 40 is disposed at the center of the rectangular flexure 22. The end portion 29 of the load beam offset 28 contacts the load protuberance 40 and provides the loading force derived from the spring element configuration, that is required to bring the head slider into close flying relationship with the moving storage medium.

One feature of this invention is that the flexure 22, which supports the head slider assembly, is pivotable around the two axes which intersect at the load contact point between the load beam and the protuberance 40. This contact point serves as a pivot point about which the flexure may pitch and roll, in order to follow the changing topography of the moving medium 30. The pivot point is located on the central finger 36 and centrally on the flexure geometry. The use of the central finger 36 with a free end allows the head slider assembly 38 to respond to changes in the air bearing rapidly and without resistance.

With the specific configuration disclosed above, the head suspension does not experience bending forces from the accessing movements. In effect, the novel head suspension is rigid and resistant to radial, circumferential and yaw motions, and to deflections, as referenced to the longitudinal axis that passes through the welds 27 and the load protuberance 40; as well as to the intersecting orthogonal axis that also passes through the load protuberance.

The balanced configuration, particularly that of the flexure 22, which has flexible fingers straddling the centrally located finger and the head slider, ensures that the assembly responds accurately and quickly to variations in air bearing, so that the centrally located transducing gap constantly maintains a fixed spacing and orientation relative to the changing topography of the surface of the storage medium.

Figure 7:
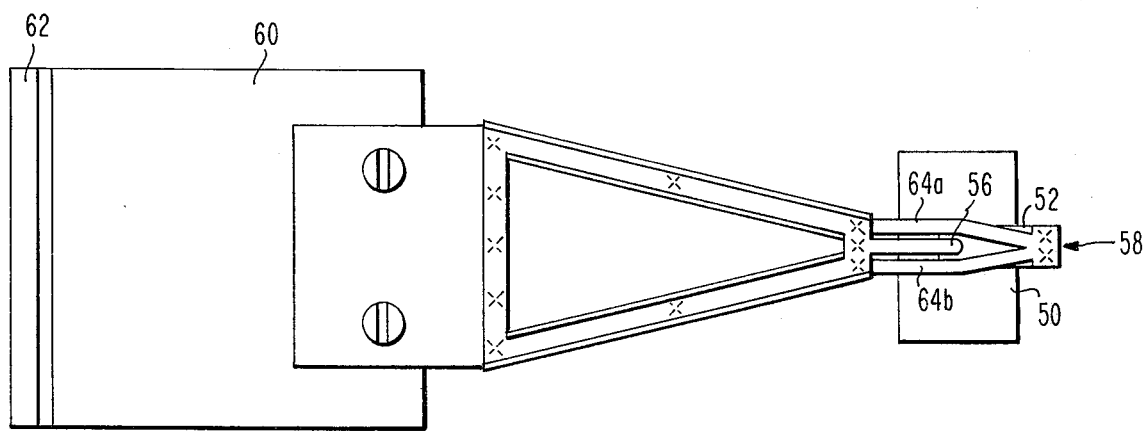
FIG. 7 is a top plan view of an alternative magnetic head arm assembly using a novel suspension.
Figure 8:
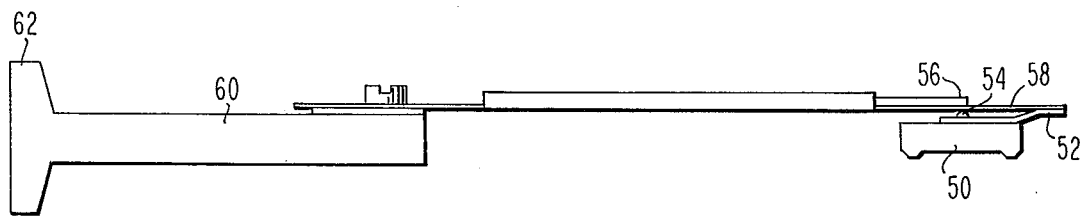
FIG. 8 is a side view of the magnetic head arm assembly of FIG. 7.

An alternative embodiment, illustrated in FIGS. 7 and 8, includes a slider assembly 50 supported by a rigid slider plate 52, which has a load button or protuberance 54 thereon. A load beam 56 is attached to a spring suspension or flexure 58, the flexure being joined to a rigid arm 60 and mount 62 at one end, and to the rigid slider plate 52 at the other end, which is the forward accessing end. The flexure 58 is formed with two narrow flexible fingers 64a,b that converge at the forward end at which the rigid slider plate 52 is joined. The two fingers are symmetrically disposed about the load beam 56 and provide flexibility of the assembly about the longitudinal axis, as well as around the pitch axis, while supplying substantial rigidity in the radial and circumferential directions of accessing motion.

There has been described herein a novel head arm assembly having a suspension or flexure for supporting an air bearing magnetic transducer. Various features and advantages may be realized by the novel configuration. The head suspension affords rapid response to changes in air bearing resulting from variations in the surface formation of the magnetic medium that moves past the transducer, with very close spacing between the medium and the transducer. Stiffness is provided in the radial and circumferential accessing directions, and the assembly is resistant to yaw. The flexure and the support element for the air bearing slider (the central finger) may be formed integrally from one piece of metal. The load protuberance may also be formed on the central finger, and be a very small protrusion of low height, yet effective for loading. The center of gravity of the flexure is substantially at the load protuberance, which serves as a pivot point for the desired response motions.

What is claimed is:

1. A magnetic head arm assembly defining a longitudinal axis comprising:
    a rigid arm section;
    a spring element joined to said arm section formed with a flanged channel and a rectangular type flexure at its free end, said flexure having two outer flexible fingers parallel to said longitudinal axis joined at their ends by a relatively wider cross leg and a third inner finger extending from said cross leg with a free end centrally located and parallel to said two outer flexible fingers;
    a load beam positioned within said channel; and
    a load protuberance on said third finger with which said load beam makes contact.

2. A magnetic head arm assembly as in claim 1, wherein said spring element is substantially symmetrical about said longitudinal axis.

3. A magnetic head arm assembly as in claim 1, including a magnetic head air bearing slider mounted to said third finger.

4. A magnetic head arm assembly as in claim 3, wherein said load protuberance is located on said longitudinal axis, and on an intersecting axis perpendicular to said longitudinal axis and bisecting said flexure, so that said flexure may pitch and roll about said axes in response to changes in the air bearing applied to said slider.

5. A magnetic head arm assembly as in claim 4, wherein said load protuberance is located at the center of gravity of said slider.

6. A magnetic head arm assembly as in claim 1, including a mount segment joined to said arm section, for attachment to a bidirectional actuator.

7. A magnetic head arm assembly as in claim 1, wherein said flanged channel is substantially triangular.

8. A magnetic head arm assembly as in claim 1, wherein said rectangular type flexure includes two crosslegs joined to said two outer flexible fingers, said crosslegs being substantially orthogonal to said longitudinal axis and said flexible fingers, said crosslegs being wider than said flexible fingers.

9. A magnetic head arm assembly as in claim 1, wherein said load beam has an offset portion for contacting said protuberance.

10. Apparatus for supporting a transducer head comprising:
    a substantially flat and thin resilient arm element having a rectangular flexure cut-out formed at a free end, said flexure cut-out including two outer flexible fingers extending in the plane of said element from its free end and joined at their ends by a less flexible cross leg, and including a flexible third finger in the plane of the flexure cut-out extending from said cross leg into the rectangular cut-out;

a load protuberance on said third finger; and a load beam fastened to said arm and positioned into contact with said load protuberance.

11. An apparatus as described in claim 10 further including an air bearing slider mounted to said third finger.

12. An apparatus as described in claim 11 wherein said load protuberance is located on a longitudinal axis formed by said arm element and said load beam, and on an intersecting orthogonal axis bisecting said flexure, so that said flexure may pitch and roll about said axes in response to changes in the air bearing applied to said slider.

13. An apparatus as described in claim 10 wherein said spring element is substantially triangular, with a triangular cut-out section forming channels flanged for stiffening.

14. An apparatus as described in claim 13 wherein said rectangular flexure cut-out includes cross legs substantially orthogonal to said flexible fingers and to a longitudinal axis formed by said arm element and said load beam, said cross legs being wider than said flexible fingers.

15. A cantilever support for supporting a slider structure in a floating fluid bearing environment comprising:

a rigid arm section supported at one end;

a resilient arm element fastened on one end to said rigid arm section, said element having a rectangular flexure cut-out formed at a free end, said flexure cut-out including two outer flexible fingers extending in the plane of said element from its free end and joined at their ends by a relatively wider cross leg, and including a flexible third finger in the plane of the flexure cut-out extending from said cross leg into the rectangular cut-out, said slider structure being mounted to said third finger;

a stiffening section formed on said resilient arm element extending between said flexure cut-out approximately to said rigid arm section;

a load protuberance on said third finger; and a load beam fastened to said stiffening section and positioned into contact with said load protuberance;

wherein said load protuberance is located on a longitudinal axis formed by said rigid arm section, said resilient arm element, and said load beam, and on an intersecting axis perpendicular to said longitudinal axis bisecting said flexure, such that said flexure may pitch and roll about said axes in response to changes in the air bearing applied to said slider.

* * * * *